(12) United States Patent
Muehlberghuber et al.

(10) Patent No.: US 12,534,010 B2
(45) Date of Patent: Jan. 27, 2026

(54) CONSTRUCTION VEHICLE

(71) Applicant: Wacker Neuson Linz GmbH, Hörsching (AT)

(72) Inventors: Philipp Muehlberghuber, Linz (AT); Thomas Mayr, Kremsmuenster (AT)

(73) Assignee: Wacker Neuson Linz GmbH, Hörsching (AT)

( * ) Notice: Subject to any disclaimer, the term of this patent is extended or adjusted under 35 U.S.C. 154(b) by 436 days.

(21) Appl. No.: 18/101,921

(22) Filed: Jan. 26, 2023

(65) Prior Publication Data

US 2023/0234492 A1    Jul. 27, 2023

(30) Foreign Application Priority Data

Jan. 27, 2022  (DE) ..................... 10 2022 101 937.3

(51) Int. Cl.
*B60P 1/64*   (2006.01)
*B60P 7/13*   (2006.01)

(52) U.S. Cl.
CPC .............. *B60P 1/6427* (2013.01); *B60P 7/13* (2013.01); *B60Y 2200/417* (2013.01)

(58) Field of Classification Search
CPC ................................. B60P 1/6427; B60P 7/13
See application file for complete search history.

(56) References Cited

U.S. PATENT DOCUMENTS

| | | | | |
|---|---|---|---|---|
| 3,362,552 | A * | 1/1968 | Thiele | B60P 1/6427 414/469 |
| 3,425,576 | A * | 2/1969 | Martin | B60P 1/6427 414/498 |
| 3,476,275 | A * | 11/1969 | Cowlishaw | B60P 1/6427 414/498 |
| 3,486,652 | A * | 12/1969 | Seward | B60P 1/6427 203/DIG. 20 |
| 3,817,413 | A * | 6/1974 | Ham | B60P 1/6427 410/67 |
| 3,988,035 | A * | 10/1976 | Corompt | B60P 1/6463 414/498 |
| 4,522,550 | A * | 6/1985 | Whitehouse | B60P 1/6427 254/47 |
| 5,562,390 | A | 10/1996 | Christenson | |
| 6,068,440 | A * | 5/2000 | Lang | B60P 7/13 414/500 |
| 6,582,176 | B1 * | 6/2003 | Lehner | B60P 1/6427 414/498 |
| 10,173,572 | B2 * | 1/2019 | Kibler | B60P 1/6454 |

(Continued)

FOREIGN PATENT DOCUMENTS

| | | |
|---|---|---|
| AT | 407135 B | 12/2000 |
| DE | 3138824 | 4/1983 |
| DE | 3138824 A1 | 4/1983 |

(Continued)

*Primary Examiner* — Jason S Morrow
(74) *Attorney, Agent, or Firm* — Boyle Fredrickson, S.C.

(57) ABSTRACT

A construction vehicle includes a base vehicle and a skip superstructure with a tipping unit. The base vehicle comprises a driver unit, and an articulated steering system with an articulation. The vehicle comprises a coupling unit on the vehicle for coupling and uncoupling a demountable superstructure. The demountable superstructure comprises one or more coupling elements for coupling the demountable superstructure to the base vehicle.

24 Claims, 12 Drawing Sheets

(56) References Cited

U.S. PATENT DOCUMENTS

| | | | |
|---|---|---|---|
| 2023/0145943 A1* | 5/2023 | Allen .................... | B60P 1/286 298/12 |
| 2023/0234492 A1* | 7/2023 | Muehlberghuber .. | B60P 1/6427 414/498 |

FOREIGN PATENT DOCUMENTS

| | | |
|---|---|---|
| DE | 29905528 U1 | 8/2000 |
| DE | 202008016731 U1 | 2/2009 |
| DE | 202012007089 U1 | 10/2012 |
| DE | 112012004754 T5 | 11/2014 |
| DE | 102018133570 A1 | 6/2020 |
| DE | 102019102818 A1 | 8/2020 |
| DE | 102020117247 A1 | 12/2021 |
| EP | 0286878 A2 | 10/1988 |
| EP | 3211141 A2 | 8/2017 |
| GB | 1489113 A | 10/1977 |
| JP | 5052637 | 10/2012 |
| WO | 2016020004 A1 | 2/2016 |

* cited by examiner

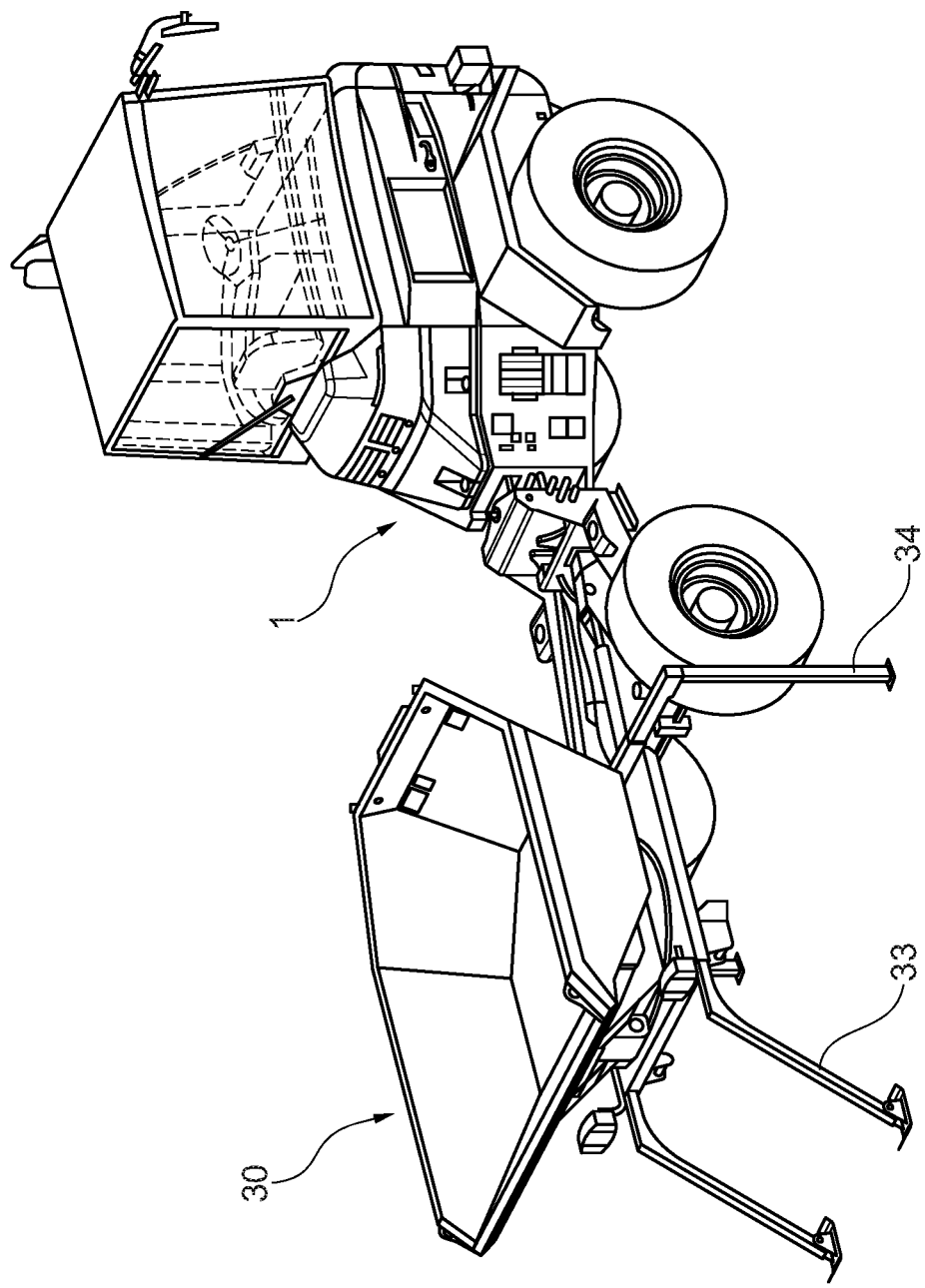

CONSTRUCTION VEHICLE

BACKGROUND OF THE INVENTION

1. Field of the Invention

The invention relates to a construction vehicle having with a base vehicle and a superstructure, in particular, a skip superstructure with a tipping unit.

2. Description of the Related Art

A wide variety of construction vehicles are known under the term dumper or skip dump truck. Such a construction vehicle is described, for example, in the publication EP 3 211 141 A2. The construction vehicle described there is to be used as a special vehicle with a so-called "articulated steering" only for use as a dumper or skip dump truck.

In addition, dumpers with stub axle steering, skid steering, rear-wheel steering, front-wheel steering or all-wheel steering are also known. Many trucks or alternatively so-called semi-trailers have a skip for tipping or alternatively unloading the construction material, some of which are demountable.

A so-called concrete mixer with a demountable concrete container is disclosed in the publication GB 2 440 675 A, wherein the trailer or vehicle frame comprises a hoisting/lifting mechanism for demounting the superstructure, which comprises, among other things, a lifting cylinder or alternatively a hydraulic cylinder.

The containers are secured to the trailer or vehicle frame for transport. For this purpose, four manual locking mechanisms are provided for secure locking of the superstructure, which mechanisms secure/lock/fasten the container or alternatively its securing pins on both sides of the vehicle frame or trailer and at the front and rear, respectively, with a latch. The manual locking at four points distributed about the vehicle is very costly and cumbersome.

In addition, securing mechanisms for superstructures with special actuating/lifting cylinders and, in some cases, various tension cables and return springs or similar have already become known for construction vehicles, so that semi-manual actuation by a control unit is feasible. The construction of these securing or alternatively locking systems are however complex and prone to failure.

SUMMARY OF THE INVENTION

An object of the invention is, in contrast, to propose a construction vehicle with a base vehicle and a superstructure, which construction vehicle at least partially remedies the disadvantages of the state of the art, is, in particular, realized with less effort, and/or ensures safe operation or a safe working mode, and/or enables novel functionalities.

This task is solved, starting from a construction vehicle having a base vehicle and a skip superstructure with a tipping point. The base vehicle has two vehicle units with an articulation arranged therebetween so as to permit the two vehicle units to pivot relative to one another. The base vehicle comprises a driver unit, and an articulated steering unit for steering the base vehicle. The steering unit has at least one of, stub axle steering, skid steering, rear-wheel steering, front-wheel steering, and all-wheel steering. The base vehicle additionally comprises a coupling unit for coupling and/or uncoupling a demountable superstructure with one or a plurality of coupling elements on the base vehicle. A demountable superstructure is provided, which superstructure comprises one or a plurality of coupling elements for coupling the demountable superstructure to the base vehicle. The demountable superstructure can be rotated about a first axis of rotation with a first radius during coupling and/or uncoupling. A lifting device with a lifting drive is provided for lifting the demountable superstructure. The base vehicle further comprises 1) a linear drive unit which is configured in the form of an unlocking/locking and/or tensioning unit and 2) at least one first coupling element of the coupling unit on the base vehicle, the position of which can be changed by the drive unit. The linear drive unit is also configured as the lifting drive of the lifting device.

Accordingly, a construction vehicle according to the invention is characterized in that the drive unit includes a linear drive unit that is configured as an unlocking/locking and/or tensioning unit, is also configured as the lifting drive of the lifting device.

In this manner, on the one hand, at least an active lifting of the demountable superstructure and, on the other hand, at least an active unlocking or locking/tensioning is provided or alternatively realized according to the invention by the drive unit. With the aid of this dual function of the drive unit for unlocking/locking/tensioning and at the same time also for lifting/lowering, a significant reduction in expenditure for the design and financial aspects and also for control technology can be realized.

In addition, operational safety and susceptibility to faults are improved compared to the state of the art by reducing the complexity of the overall system and the dual use of the drive unit.

It is precisely the (active) locking/tensioning of the unlocking/locking and/or tensioning unit that is in stark contrast to many passive securing systems for securing or alternatively simply holding/positioning the demountable superstructure. This means that, in the state of the art, simple mechanical stops and in some cases, friction surface holders are often provided, which merely exhibit a securing/positioning by stops or alternatively by a shifting forward of the demountable superstructure during braking. In so doing, in a rearward direction, which is to say during acceleration, a simple friction surface is often provided, which is to say, the superstructure merely rests on the base vehicle/vehicle frame and generates a corresponding frictional force with its comparatively large weight, which prevents slippage to the rear at the comparatively low accelerations which can usually be realized by trucks, etc. In contrast, the disclosed manual latches of the publication GB 2 440 675 A mentioned at the beginning represent a real and safe mechanical locking, both to the front, to the rear and also to the top, which is to say, against unintentional lifting, for example, in the case of irregularities of the ground during driving.

In the sense of the invention, such a "real" or safe and mechanical locking, which is to say, firm/secure fastening, of the demountable superstructure can be actively implemented in an advantageous manner with the drive unit.

The advantageous drive unit can also be used, among other things, to achieve secure locking or alternatively locking without play. This means that, in the tensioned or alternatively locked condition, there is no intermediate space or alternatively air/gap or tolerance between the two locking components of the base vehicle and of the demountable superstructure. In this manner, a so-called "deformation" or "deflection" of the locking can effectively be prevented, even in the event of locking or alternatively abrasion. Accordingly, a firm, wobble-free fastening of the demountable superstructure is achieved, even over long periods of time or alternatively even in the case of locking or abrasion. This is precisely important for the high forces or alternatively weights of such superstructures on construction vehicles, especially for operational safety and/or service life. The manual latches or return springs according to the above-mentioned state of the art either necessarily have a certain amount of play in order to be able to manually insert the latch into the retainer, and/or have only low retaining forces, for example, only the return spring force, potentially plus frictional forces.

The base vehicle comprises a coupling unit on the vehicle for coupling and uncoupling the demountable superstructure to the base vehicle, wherein a demountable superstructure is also provided which comprises one or a plurality of coupling elements on the superstructure side for coupling the demountable superstructure to the base vehicle. The base vehicle can thus be used without a superstructure or with a different superstructure. In so doing, this allows a more flexible use of the base vehicle for functionally different superstructures, for example, a tiltable skip, a so-called three-way tipper, a skip loader, a water or alternatively liquid container, a pressure vessel, an open or (partially) closed platform/superstructure and/or a concrete mixer, etc. Different skip superstructures can also be used flexibly according to the invention. In addition, a defective superstructure or a defective base vehicle can also be quickly switched out.

Advantageously, the base vehicle comprises the drive unit and at least one coupling element on the vehicle and/or the superstructure, the position of which can be changed by the drive unit. With such a drive unit, the adjustment of the coupling element on the vehicle and/or the superstructure makes it easier to uncouple and couple or alternatively securely lock the superstructure.

In a particular further development of the invention, it is provided that the drive unit is a linear drive unit, in particular a hydraulic lift cylinder, and/or that a distance between at least two coupling elements can be varied by the drive unit. With two coupling elements arranged at a distance from one another, a more stable anchoring of the superstructure to the base vehicle is possible, which is of particular advantage if, for example, the superstructure comprises a tilting function and the superstructure is thus to be held on the base vehicle in different load conditions.

By adjusting the distance between the two coupling elements, the elements can be actuated by a common drive element. Moreover, this also makes locking/tensioning of the superstructure possible, as will be explained further below. With tensioning, it is in turn also possible to realize an attachment without play, which can moreover be independent of the wear of the coupling elements.

If the one adjustment and/or drive direction of the linear drive unit and/or of the first coupling element on the vehicle is aligned parallel to the longitudinal axis and/or direction of travel of the base vehicle, in particular in forward travel, which is to say, in the longitudinal direction of the base vehicle, then coupling elements on the vehicle and/or superstructure side arranged at a distance from one another in the longitudinal direction must thereby also accordingly be actuated. In so doing, a good and secure fastening of the superstructure, as well as without play, is possible against changes in load in the longitudinal direction, in particular in the case of locking or abrasion of the coupling elements. Such changes in load occur not only during travel but rather also, for example, in the case of a skip superstructure, when the skip is tipped backwards.

Advantageously, the lifting device comprises at least one engagement element having a contact surface that is to be arranged on the demountable superstructure and/or for lifting the demountable superstructure in a lifting position, wherein, in particular, at least in the lifting position, the center of gravity of the demountable superstructure is arranged between the contact surface of the engagement element and the first axis of rotation and/or that the lifting device in the lifting position for lifting the demountable superstructure, with an engagement element in front of the center of gravity of the demountable superstructure, engages with this mounted superstructure with a driver unit and/or driver cab respectively arranged in front of the superstructure with respect to the first direction of travel, in particular with respect to the forward direction of travel.

In order to drive the base vehicle out from under an uncoupled demountable superstructure, the demountable superstructure should be raised relative to the base vehicle. The lifting device with a lifting drive for lifting the demountable superstructure is provided on the base vehicle for this purpose. In this manner, the demountable superstructure can be set down in an elevated position by the lifting device on the vehicle, for example, on at least two or three, in particular four, supports or the like, such that the base vehicle can then advantageously be driven out from under the demountable superstructure.

If necessary, the tipping axis of the demountable superstructure and/or the skip is also the first axis of rotation of the demountable superstructure or alternatively the skip. In an advantageous manner, a double function of the first axis of rotation is hereby realized or alternatively provided, namely for tilting and for demounting. This also supports the dual function of the drive unit. In this way, a constructively less complex and economically more favorable implementation can be realized.

Compared to a vertical lifting movement of the demountable superstructure, it is thereby sufficient and simpler to lift the demountable superstructure at an angle on one side. This can be achieved, for example, by the lifting device preferably engaging the demountable superstructure in the lifting position with an engagement element arranged in front of the center of gravity of the demountable superstructure in relation to the forward direction of travel. Through this arrangement of the point of engagement, the demountable superstructure is lifted at an angle to its front end upon the lifting device being actuated, such that the vehicle can advantageously then be driven out (forward) under the demountable superstructure.

For uncoupling and putting down the demountable superstructure, at least two rear supports can, for example, be fitted before lifting, on which supports the demountable superstructure is supported at the front during lifting. Subsequently, it is also possible that supports spaced further forward or distanced away from the rear supports, for example, at least two front supports, can also be fitted, on which supports the demountable superstructure is then supported when the lifting device is lowered, wherein a small distance to the chassis of the base vehicle remains and the chassis of the base vehicle can be moved out from under the demountable superstructure.

In an advantageous embodiment, the lifting device uses the linear drive unit provided as the unlocking/locking and/or tensioning unit, such that no separate drive is required for the lifting device. The linear drive for unlocking/locking and/or tensioning the coupling elements is accordingly also the lifting drive of the lifting device.

In an advantageous variant of the invention, the lifting device comprises a lever arrangement, in particular a toggle lever, wherein, in particular, the lever arrangement and/or the toggle lever comprises at least the contact surface and/or the engagement element. In order, for example, to derive an otherwise/differently aligned adjustment from the substantially horizontal and/or linear movement of the drive according to the invention, and/or at least partially vertically aligned transverse movement or lifting movement, the lifting device configured in a special embodiment is provided with the lever arrangement, which can in particular comprise the toggle lever. At the same time, a power transmission can also be realized in an advantageous manner with the toggle lever if appropriately dimensioned and arranged, since, depending on the embodiment, the power requirements for the lifting device may differ from those for the tensioning/locking of the coupling elements.

As an alternative to the lifting device described above, the lifting device could also be implemented independently of the drive of the coupling elements, for example, in the form of a height-adjustable running gear or one or a plurality of separate lifting cylinders on the demountable superstructure or on the base vehicle.

Advantageously, at least a first drive phase of the drive unit configured in particular as a lifting drive is configured as an unlocking/locking and/or tensioning phase, and in addition a second drive phase of the drive unit configured in particular as a lifting drive is configured as a lifting or lowering phase of the lifting device. Hereby, in an advantageous manner, a mechanical and/or temporal decoupling or temporally offset operation of the different operating or alternatively drive phases can be realized, in particular with the common drive or alternatively the common drive unit.

In an advantageous further development of the invention, an overrunning clutch is provided via a freewheeling section, in particular in the form of an elongated hole guide with a stop element connected to the lever arrangement. In this case, the freewheeling section should be greater than or equal to a change in distance provided for tensioning and/or locking between two coupling elements provided for tensioning and/or locking of the demountable superstructure. The use of such an overrunning clutch enables the unlocking/locking and/or tensioning and detensioning of the coupling elements without being influenced by the lifting device. This actuation of the coupling elements can be performed while the lifting device is in the overrunning clutch of the drive device.

In this way, the coupling elements can, for example, be directly connected to the drive, in particular to a lifting cylinder, whereas the lifting device is moved, for example, by an entrainment element/pin sliding in an elongated hole guide and remains in the rest position until the entrainment element/pin strikes against an end stop of the elongated hole guide. At this point in time, the demountable superstructure is already unlocked or released so that it can be lifted without difficulty, whereas the distance between the coupling elements is further reduced. In the opposite direction, the demountable superstructure is lowered, whereas the coupling elements move apart at the same time, but the tensioning/locking does not start until the demountable superstructure has reached its lowest position and the lifting device goes into the overrunning clutch.

In an advantageous design of the coupling unit, at least one of the coupling elements on the vehicle and/or superstructure side comprises an unlocking/locking and/or tensioning surface that runs obliquely with respect to the longitudinal axis and/or direction of travel of the base vehicle. With such oblique unlocking/locking and/or tensioning surfaces, linear thrust can be used to generate unlocking/locking and/or tensioning forces that are oriented obliquely or orthogonally to the direction of thrust. Such a coupling element can thus be used to tension a superstructure on a chassis of the base vehicle. Such a construction has the further advantage that, in the event of wear of the unlocking/locking and/or tensioning surface or of the component abutting thereon, the desired locking/tensioning force is maintained by a tensioning/pressure in the direction of thrust. Such a coupling element can be configured, for example, as a linearly displaceable unlocking/locking and/or tensioning wedge.

Usually, construction vehicles have a preferred so-called forward travel direction and a so-called reverse travel direction. In the so-called forward travel direction, the driver cab or alternatively the driver is usually located in front of the superstructure or alternatively the tipping unit, and in the so-called reverse travel direction, the driver cab or alternatively the driver is usually located behind the superstructure or alternatively the tipping unit. The same applies to the so-called rear of the vehicle and the corresponding so-called front of the vehicle.

In an advantageous manner, the construction vehicle, in particular a dumper or the like, can however have a driver console or driver cab that can be rotated in particular about an essentially vertically aligned axis of rotation, such that the driver can look "forward" in both directions of travel and there are no fixed, so-called "forward/reverse travel directions" or "front/rear sides". In the sense of the invention, the vehicle moves "forward" in two different ways, one in which the superstructure is arranged behind the driver or the driver cab with respect to the direction of travel and one in which the superstructure is arranged in front of the driver or the driver cab with respect to the direction of travel.

In the following, however, the so-called reverse travel direction in the sense of the invention is to be understood as the travel or travel direction in which the superstructure is arranged in front of the base vehicle or alternatively the driver unit. Accordingly, the so-called forward travel direction in the sense of the invention is to be understood as the travel or travel direction in which the superstructure is arranged behind the base vehicle or alternatively the driver unit. Moreover, hereinafter, in the sense of the invention, the so-called rear side shall designate the side of the vehicle which is oriented/exposed to the rear or alternatively against the forward travel direction during the aforementioned so-called forward travel. In this sense, the front side faces forward during the aforementioned so-called forward travel.

Furthermore, it is advantageous if a coupling element on the vehicle comprises a receiving opening oriented towards a side of the base vehicle facing away from the driver unit and/or the driver cab, in particular towards a rear side, for receiving at least one coupling element on the superstructure. As a result, a suitable coupling element on the superstructure side can be accommodated by this coupling element on the vehicle via a rearward movement of the base vehicle.

If the coupling element on the vehicle with receiving opening comprises two guide surfaces running obliquely towards each other in a first direction of travel, in particular a forward travel direction with a driver unit and/or driver cab arranged in front of the superstructure, a V-shaped guide is configured in which the matching coupling element on the superstructure side is guided into its end position. At the same time, at least one of these guide surfaces can be provided as an unlocking/locking and/or tensioning surface for locking/tensioning the demountable superstructure to the base vehicle, for example, to its chassis, via the coupling element on the superstructure side.

Such a locking/tensioning can be brought about, for example, with a single linear drive if a rear coupling element on the vehicle side comprises a guide surface extending downward from the rear to the front and a front coupling element on the vehicle comprises an unlocking/locking and/or tensioning surface extending downward from the front to the rear. In this manner, it is possible that two coupling elements on the vehicle in the contracted position can be brought under two coupling elements on the superstructure that are fixedly attached to the demountable superstructure, and, in an expanded position, can engage under them, thereby mutually tensioning/locking the coupling elements on the superstructure and vehicle.

In this condition of the demountable superstructure that is tensioned/locked to the base vehicle, a rear coupling element on the superstructure thus engages under the downwardly extending guide surface of the rear coupling element on the vehicle and a front coupling element on the superstructure engages under the downwardly extending unlocking/locking and/or tensioning surface of the front coupling element on the vehicle.

Advantageously, at least one second axis of rotation is provided, about which the demountable superstructure can be rotated with a second radius during the coupling and/or uncoupling phase, wherein the demountable superstructure is rotatable about the first axis of rotation in a first rotational phase and rotatable about the second axis of rotation in a second rotational phase. In this, the first radius of the first axis of rotation is preferably other/different, in particular smaller than the second radius of the second axis of rotation.

In this manner, during the coupling and/or uncoupling phase, the demountable superstructure can be rotated in an advantageous manner about the first axis of rotation with a first radius, wherein in a second rotational phase, the demountable superstructure rotates in an advantageous manner about the second axis of rotation, wherein, in particular, the first radius of the first axis of rotation is configured smaller than the second radius of the second axis of rotation and/or wherein the first axis of rotation is configured as an unlocking/locking and/or tensioning element of the unlocking/locking and/or tensioning unit and/or wherein the second axis of rotation is configured as a supporting element of the demountable superstructure.

In an advantageous variant of the invention, the first axis of rotation is configured as a pin element of the demountable superstructure and/or as a unlocking/locking and/or tensioning element of the unlocking/locking and/or tensioning unit and/or in that the second axis of rotation is configured as a support element of the demountable superstructure. This results in a design or process engineering improvement and thus a financial improvement. Advantageously, an optional length adjustment unit for the second axis of rotation of the support element, in particular with a fastening option/element, can also be used either manually and/or semi-automatically. With this, an advantageous adaptation of the length of the support element to irregularities of the ground or the like can be realized.

In order to ensure that the demountable superstructure is reliably fastened to the base vehicle, it is possible that a sensor unit, in particular in the form of a mechanical button movable by a coupling element on the superstructure, can be provided for monitoring purposes to detect a coupled demountable superstructure.

Such a sensor unit can also be used in an advantageous manner to equip the control unit of the base vehicle with a safety system. By way of example, the base vehicle can have a control unit for a control of the driving speed that is dependent on the type of coupled demountable superstructure. It is also possible to control the driving speed depending on whether a demountable superstructure is coupled or not.

For easier operation when picking up and putting down the demountable superstructure, it is advantageous if a control element arranged outside the driver unit is provided for operating the unlocking/locking and/or tensioning unit.

Furthermore, it is advantageous if the control unit comprises at least two operating modes that can be selected by the operator, for example, a driving mode and a demounting mode, wherein in the driving mode an activation of at least one travel function, such as the automatic retensioning of the unlocking/locking and/or tensioning unit and/or the control of the travel speed is provided. In the demounting mode, in turn, a deactivation of such a driving function and/or an activation of a demounting function, such as the release of the control element arranged outside the driver unit, can be provided.

In an advantageous variant of the invention, it is provided as a safety function that, for example, the construction machine or the base vehicle can drive in an advantageous manner only if the unlocking/locking and/or tensioning unit or the drive unit/hydraulic cylinder is actuated, which is to say, in particular, is subjected to tensioning energy/force or pressure. The unlocking/locking and/or tensioning unit is advantageously permanently tensioned or alternatively subjected to pressure/tensioning energy during operation. In this way, a permanent lack of play can also be achieved if the contact surfaces of the locking device wear over time. Accordingly, operational reliability is hereby further improved.

Moreover, in a particular further development of the invention, two actuating elements such as two switches or pushbuttons can be provided in an advantageous manner for actuating or operating the system. With an advantageous interconnection of these elements, it can, for example, be ensured that the driving function and/or also the demounting function is (only) enabled when the switches/buttons are in the correct combination or alternatively are actuated.

In general, the superstructure such as a skip, water/fluid/-container, platform, crate or the like of a construction vehicle, such as a dumper, concrete mixer, sprayer, etc., can be optimized in each case for the transport of the respective material such as of bulk material. In order to make the construction machine or alternatively base vehicle more versatile, a semi-automatic superstructure demounting system can be used.

In accordance with another aspect, a construction vehicle includes 1) a base vehicle having two vehicle units with an articulation arranged therebetween so as to permit the two vehicle units to pivot relative to one another, the base unit including a driver cab, and 2) a skip superstructure having a tipping unit. A lifting device is configured to lift the demountable superstructure relative to the base vehicle. A linear drive unit is provided on the base vehicle, the linear drive unit including a linear drive and a first coupling element that is movable with the linear drive unit to selectively 1) couple the first coupling element on the base vehicle to a first coupling element on the demountable superstructure to inhibit relative movement between the base vehicle and the demountable superstructure and 2) uncouple the first coupling element on the base vehicle from the first coupling element on the demountable superstructure to permit relative movement between the base vehicle and the demountable superstructure. The linear drive unit is also configured as a lifting drive of the lifting device. The coupling elements are configured such that the demountable superstructure can be rotated about a first axis of rotation with a first radius during coupling or uncoupling operations.

A construction machine system according to the invention, which is to say, for example, one or a plurality of common base vehicles with one or a plurality of, possibly different, tipping or skip bodies and/or with a liquid tank and/or a platform, etc., can fulfill the following requirements or advantages individually or in combination:

The construction machine or alternatively base vehicle, such as a dumper should be able to continue to perform its main task, which is to say, transporting goods such as bulk materials without restriction.

The superstructure should be able to be changed out by a single person without the use of additional machinery, such as a crane, and without the use of tools.

The superstructure should be locked automatically and without play, in order to, for example, reduce additional dynamic force inputs into the system to a minimum.

In the case of wear of the locking components, the connection without play can remain.

The superstructure should be lifted automatically.

The superstructure can be changed out within 20 minutes.

Semi-automatic superstructure demounting system without play operated by only one hydraulic cylinder.

Inclined lifting of the superstructure.

Also disclosed are a method of operating a construction machine of the type generally discussed herein, a base vehicle of the type generally discussed herein, and a demountable coupling of the type generally discussed herein.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

An embodiment example of the invention is shown in the drawing and is elucidated in more detail below with reference to the figures, in which:

FIG. 9 and FIG. 10 show perspective views of the construction vehicle in various phases when putting down a demountable superstructure.

DETAILED DESCRIPTION

Figure 1:
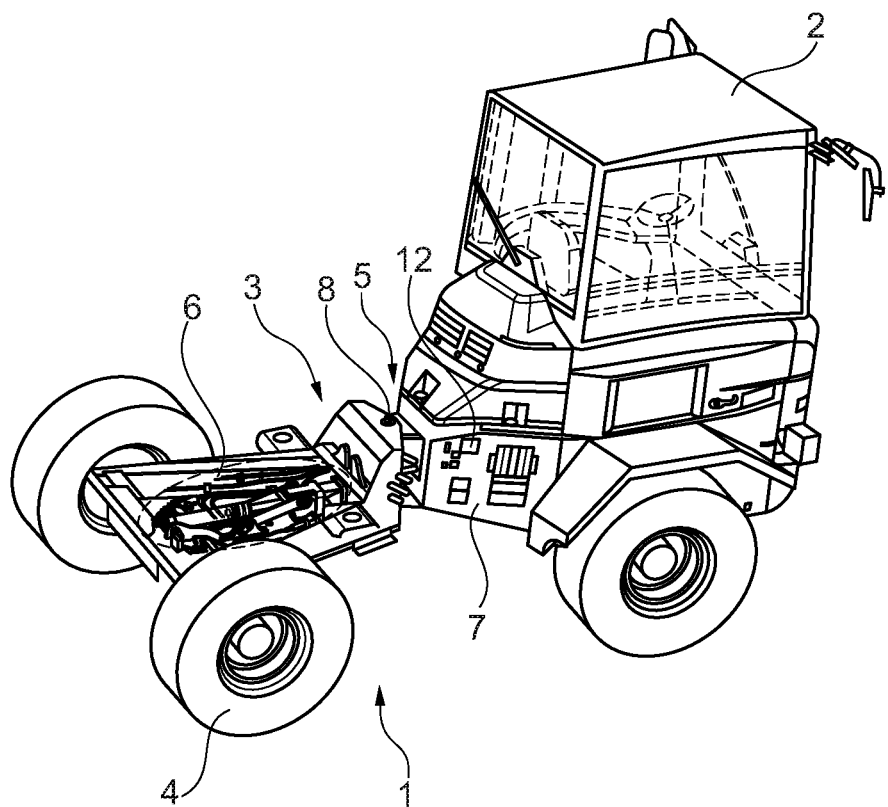
FIG. 1 shows a perspective view of a construction vehicle according to the invention.

FIG. 1 shows a base vehicle 1 for a demountable superstructure according to the invention. Vehicle 1 has a driver cab 2, a vehicle frame or alternatively chassis 3 and wheels 4. In the embodiment shown, the base vehicle 1 comprises articulated steering 5, which is to say, the chassis 3 consists of two chassis parts 6, 7 which are connected by an articulation 8. However, the base vehicle 1 can of course also have all other, generally known, steering types such as stub axle steering, skid steering, rear-wheel steering, front-wheel steering or all-wheel steering, which in addition to wheels 4 also includes chain drives and/or swing axles or the like. Exclusively for reasons of clarity or streamlining, a more detailed illustration as well as further explanations of other steering types as well as chain drives have been omitted.

Figure 2:
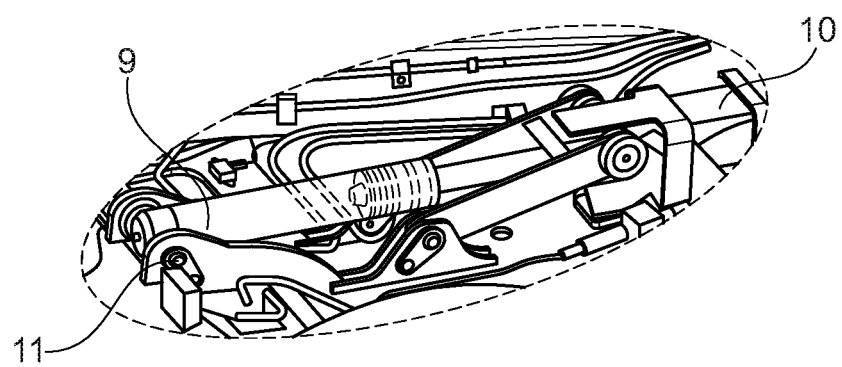
FIG. 2 shows a sectional enlargement from FIG. 1.

As can be seen in the enlargement according to FIG. 2, a tensioning cylinder 9 is located centrally in the rear chassis part 6, which carries a tensioning wedge 10 at the front and is attached to the chassis at the rear via a pin 11. An operating button 12 is installed to the front chassis part 7 to operate the tensioning cylinder outside the driver cab 2.

Figure 3:
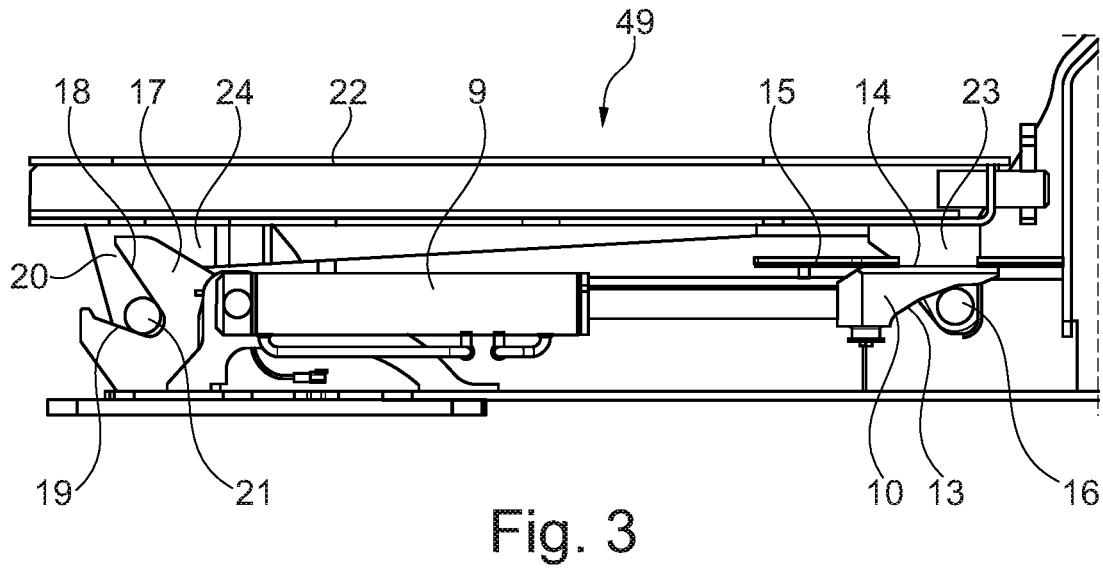
FIG. 3 shows a side view of the drive of the coupling elements.

In FIG. 3, the tensioning wedge 10 attached to the piston rod can be seen more clearly with its tensioning surface 13 extending downward from the front to the rear. The tensioning wedge 10 is flat on its top side 14 and slides along clamping plates 15. The tensioning wedge 10 tensions a front locking pin 16 downward with the tensioning surface 13, which belongs to a demountable superstructure and locks it to the chassis 3 of the base vehicle 1.

FIG. 3 also shows a receiving jaw 17 with two guide surfaces 18, 19 each extending from the rear to the front of each other behind the tensioning cylinder 9. Without greater illustration, advantageously, there are however two receiving jaws 17 and two locking pins 21 which can be arranged on both sides or respectively on the left and right of a frame 22 and/or the chassis 3.

These two receiving jaws 17 are preferably firmly installed to the chassis 3 and have a receiving opening 20 at the rear, through which a rear locking pin 21 of the demountable superstructure can respectively be received in the respective receiving jaw 17 and can be locked or alternatively tensioned there. In this illustration, only a frame 22 of the demountable superstructure itself, with front and rear brackets 23, 24 for fastening the front and rear locking pins 16, 21 is shown.

Figure 4A:
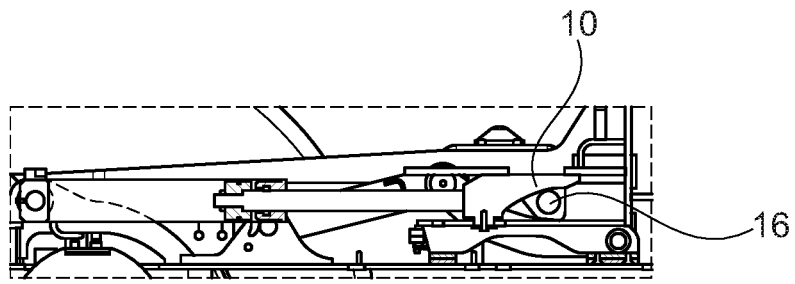
FIGS. 4A-4C show a side view of the drive of the coupling elements and the lifting device in different positions.
Figure 4B:
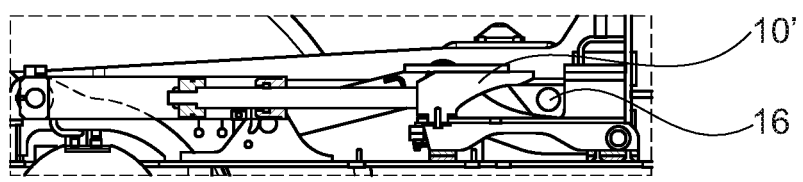
Figure 4C:
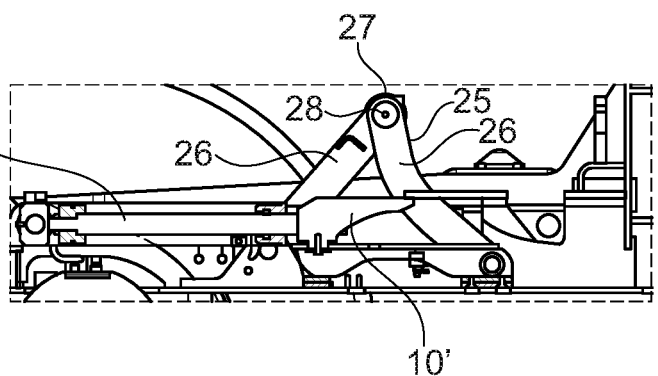

FIGS. 4A-4C show with different positions 10, 10', 10" of the tensioning wedge 10. In the position of the upper representation of FIG. 4A, the tensioning wedge 10 tensions the front locking pin 16 of a demountable superstructure. In the position of the middle illustration (FIG. 4B), the tensioning is released so that the locking pin 16 is released.

In the position illustrated in FIG. 4C, the tensioning cylinder 9 is fully retracted and a toggle lever 25, consisting of two individual levers 26 connected by an articulation 28, is raised, wherein the toggle lever 25 or alternatively the front individual lever 26 also has an end face 27. The entrainment of the front individual lever 26 during the retraction of the tensioning cylinder 9 is effected by an elongated hole guide, not shown in greater detail, which provides the toggle lever 25 with an overrunning clutch during the transition between the positions of the illustrations of FIGS. 4A and 4B. In illustration of FIG. 4C, the front locking pin 16 is no longer illustrated, which corresponds to a demountable superstructure that has been removed. The end face 27 of the front individual lever 26 can thereby, in the particular variant of the invention shown in FIG. 4*c*), advantageously form a support or alternatively a contact surface for a demountable superstructure and thereby a point of engagement of the lifting unit configured by the toggle lever 25 on the demountable superstructure.

Alternatively to the illustrated, aforementioned particular variant of the invention, the articulation 28 can have, for example, two rollers arranged on both sides (without further illustration), which form the support or contact surfaces for the demountable superstructure and thus the point of engagement of the lifting unit configured by the toggle lever 25 on the demountable superstructure, such that in an advantageous manner the demountable superstructure can roll off and/or rest on/against these advantageous rollers.

Figure 5:
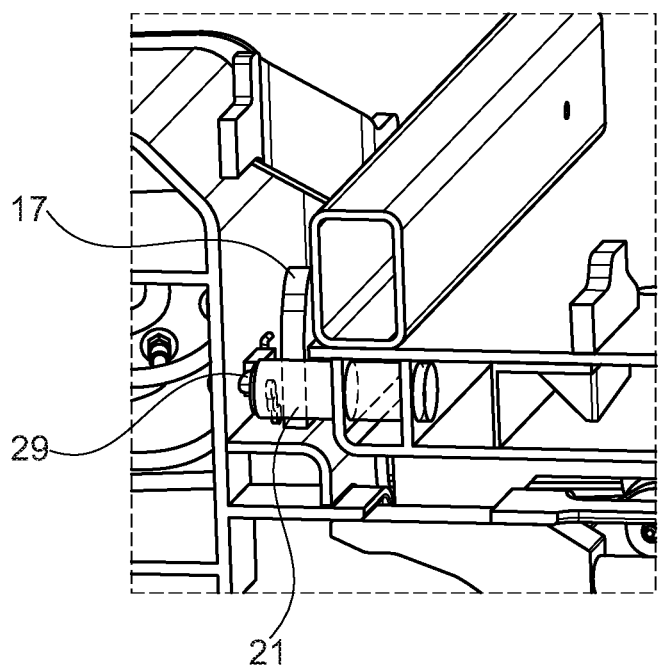
FIG. 5 shows a perspective representation of the arrangement of a locking button.

FIG. 5 shows an advantageous centering pin 21 which is mounted on the demountable superstructure. The centering pin 41 extends along the longitudinal axis of the demountable superstructure and is received on both sides by two stops 42, which are fastened to the vehicle and wherein only one of the stops 17 is shown in FIG. 5. In this way, lateral slippage of the demountable superstructure is prevented in an advantageous manner, among other things in the case of a large transverse inclination. The stops 42 on both sides of the vehicle frame prevent lateral slippage. At the same time, the centering pin serves as a trigger for a sensor 29 used to detect the locked position. A locking button 29 serves as the sensor 29 for detecting the locked position of a demountable superstructure and therefore to detect whether the base vehicle is fitted with a superstructure or not.

Figure 6:
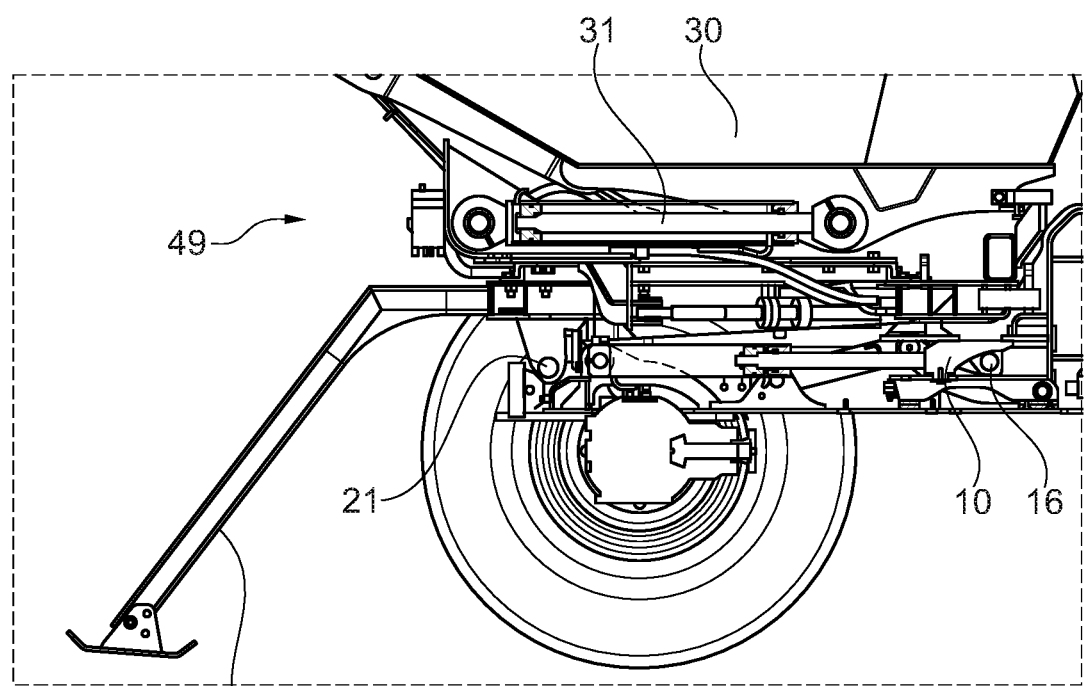
FIG. 6 to FIG. 8 show partial representations of the construction vehicle in longitudinal section at various stages while a demountable superstructure is being put down.
Figure 7:
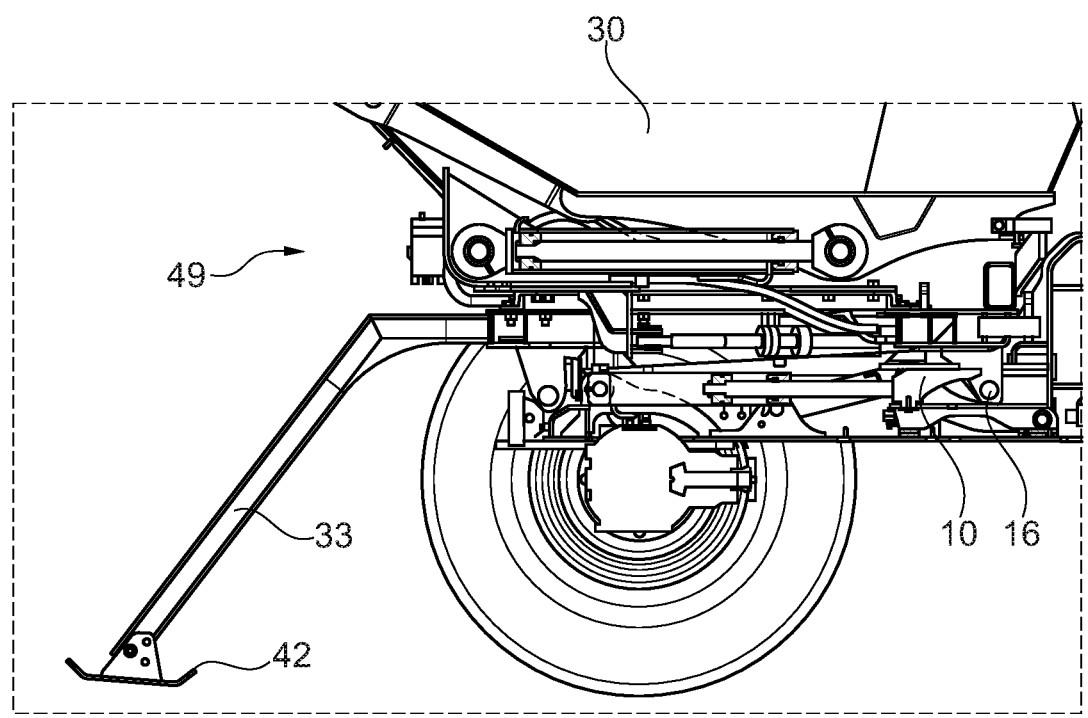
Figure 8:
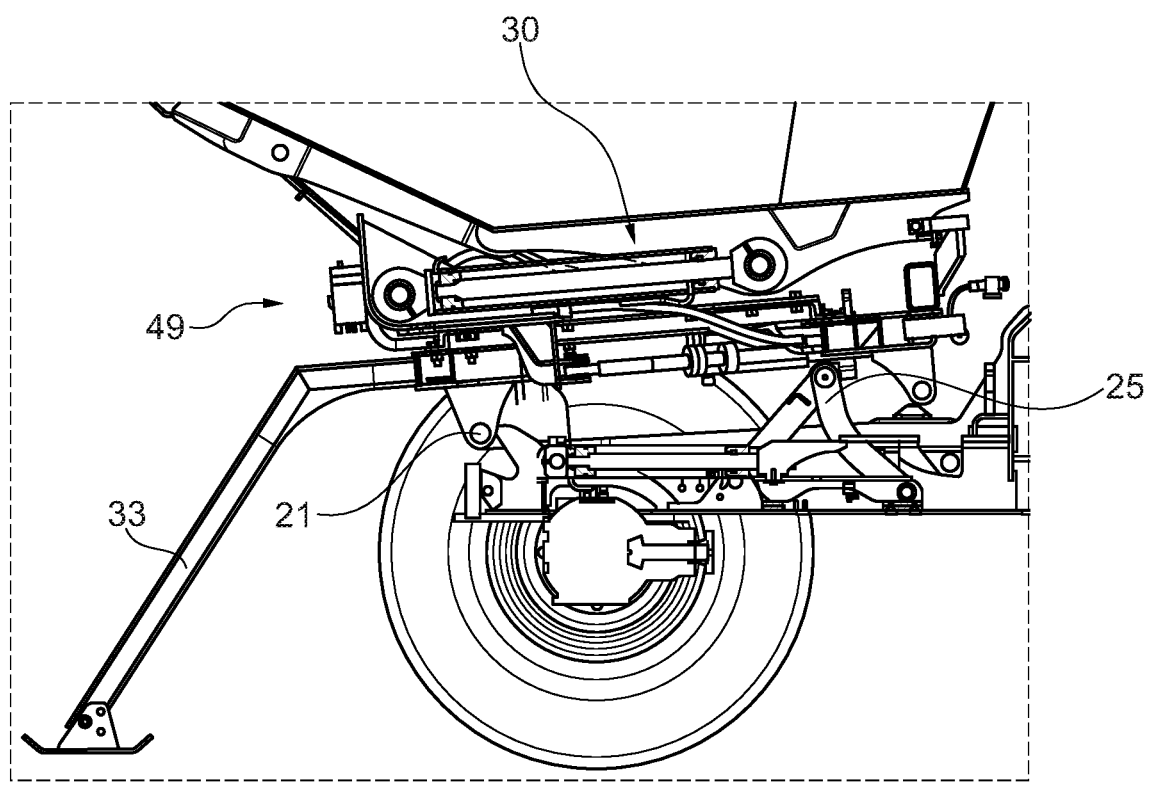
Figure 9:
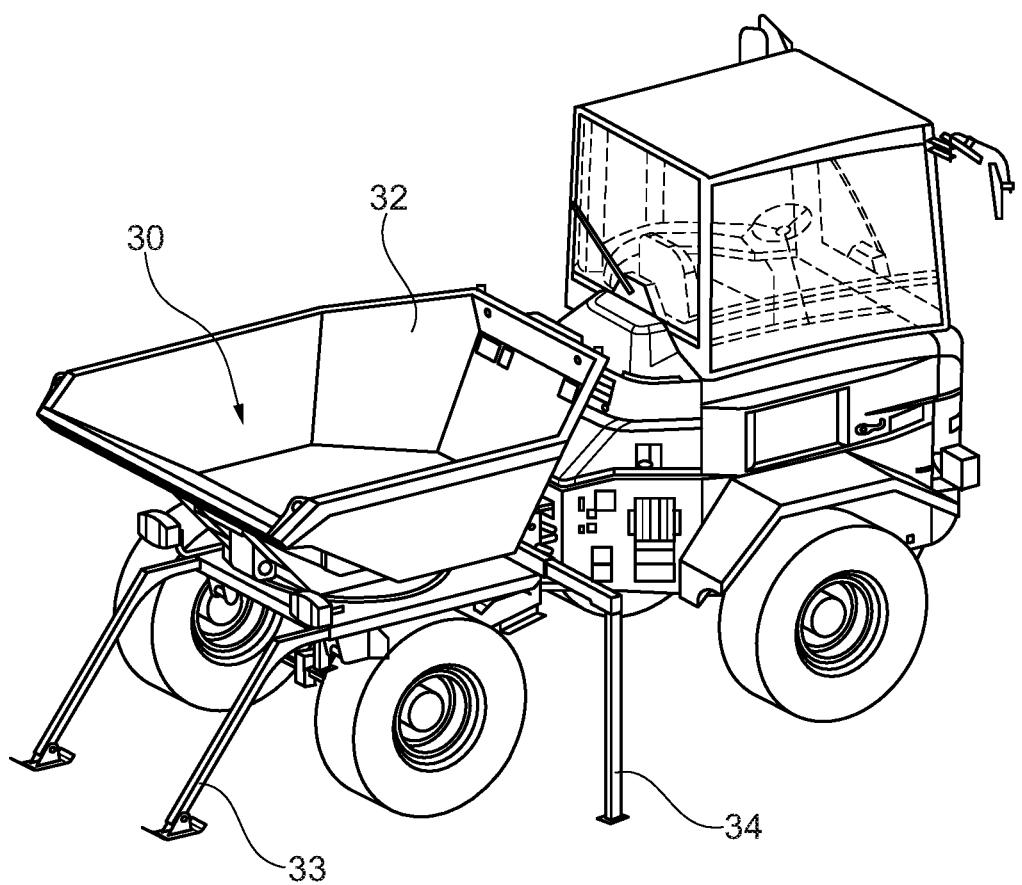

A demountable superstructure, in the form of a skip superstructure 30 is shown in part in FIG. 6 to FIG. 8, and is shown in full in a perspective view in FIG. 9 and FIG. 9. A tilt cylinder 31 is part of the demountable superstructure 30 and enables a skip 32 of the skip superstructure 30 to be tilted.

FIG. 6 to FIG. 10 serve to illustrate the attachment and detachment of the skip superstructure 30 to the base vehicle 1. The lifting of the superstructure as well as its locking is realized with the hydraulically operated tensioning cylinder 9. For this purpose, the driver in the cab can switch between a driving mode and a demounting mode by a switch. In driving mode, the tensioning cylinder is kept within a predefined pressure range by hydraulic retensioning. The operating button 12 is deactivated in the driving mode. In demounting mode, the base vehicle 1 can no longer be maneuvered. The automatic retensioning is deactivated and button 12 is activated.

In the driving mode, the tensioning cylinder 9 is pressurized. As a result, the tensioning wedge 10 is clamped between the clamping plates 15 and the front locking pin 16. A force effect in the negative Z-direction is created on the demountable superstructure 30 due to the wedge shape, which is to say, downward, whereby the demountable superstructure 30 is also pressed forward in the X-direction. The demountable superstructure is thus tensioned without play between the two receiving jaws 17 on both sides and the tensioning wedge 10. Were the locking pins 16, 21, the receiving jaws 17 or the tensioning wedge 10 to deflect over time, the entire system still remains without play inasmuch as the tensioning cylinder is under pressure and is automatically retensioned.

Upon switching to the demounting mode, the situation remains unchanged, the tensioning cylinder 9 is however no longer retensioned. In this situation, for the purpose of changing out the demountable superstructure 30, the rear supports 33 are installed on the demountable superstructure 30, for example, they are pushed into a receptacle not shown in more detail or folded out from the demountable superstructure if they are arranged directly on the demountable superstructure.

As shown in FIG. 7, the operating button 12 is then actuated in the demounting mode, whereby the tensioning cylinder 9 is retracted. In so doing, the tensioning wedge 10 first releases the front locking pin 16. As soon as the overrunning clutch of the toggle lever 25 has been passed through, the toggle lever is entrained by tensioning cylinder 9 and the demountable superstructure 30 is lifted as a result, which is shown in particular in FIG. 8. Now, the front supports 34 are attached to the demountable superstructure 30, for example, they are pushed into a receptacle not shown in more detail. This situation is shown in FIG. 9.

In principle, it is advantageous to carry the supports 33, 34 along on the base vehicle 1 and/or on the demountable superstructure 30, for example, with a fastening mechanism such as a latch, etc., and/or in a storage space or alternatively in a slide-in compartment or the like that is not shown in greater detail. As an alternative to manually attaching and/or inserting the supports 33, 34, this can also be realized semi-automatically/automatically with a support drive, in particular with hydraulic and/or electric actuators, such as, for example, hydraulic cylinders or electric motors, etc. The same can also be implemented, either manually and/or semi-automatically, with an optional length adjustment with fastening option.

If the toggle lever 25 is now lowered by extending the tensioning cylinder, the demountable superstructure then rests on its rear supports 33 and front supports 34 and the base vehicle 1 after activation of the driving mode can be moved forward out from under the demountable superstructure 30, as can be seen in FIG. 10.

The accommodation of a demountable superstructure 30 takes place in the reverse order. The demountable superstructure 30 is set down on its supports 33, 34. The tensioning cylinder 9 is extended so far that the toggle lever 25 is in the lowest position. The base vehicle 1 can now be moved under the demountable superstructure 30.

In an advantageous embodiment, the demountable superstructure can have lateral guide plates as well as front and rear stops (not shown in more detail). These lateral guide plates advantageously bring the demountable superstructure into the correct position in the lateral direction relative to the base vehicle 1. The front and rear stops limit the entry depth of the base vehicle 1 and thus ensure the correct final position in the direction of reverse travel. Once the end position for accommodation of the demountable superstructure 30 is reached, it can be accommodated.

For this purpose, the operator switches to the demounting mode and then uses the operating button 12 to retract the tensioning cylinder, which raises the demountable superstructure 30. The front supports 34 are now removed and the demountable superstructure is lowered by extending the tensioning cylinder 9 while simultaneously lowering the toggle lever 25. When the tensioning cylinder 9 is extended further, the demountable superstructure 30 is locked to the base vehicle 1 by the tensioning wedge 10 and the locking pins 16, 21. The tilting movement of the demountable superstructure 30 that begins when the toggle lever 25 is lowered relieves the load on the rear supports 33, allowing them to be removed as well.

The operator must now still establish the hydraulic connections, which are preferably configured as quick-release couplings, as well as the electrical connections, which are preferably configured as plug-in connections. It is now possible to switch back to the driving mode and the base vehicle 1 is ready for use with the accommodated demountable superstructure 30.

Figure 11A:
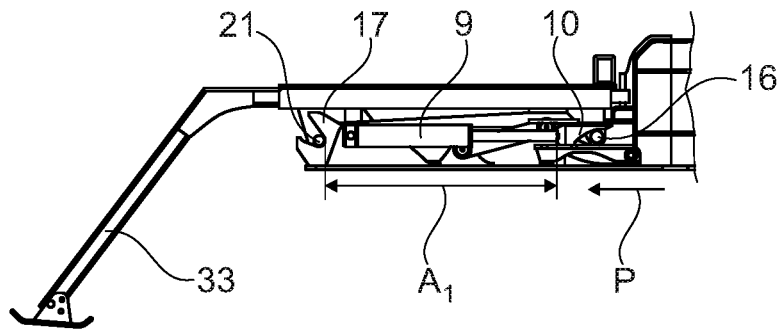
FIGS. 11A-11D, 12A-12D, and FIGS. 13A-13D show side views of the unlocking and lifting phases and of an uncoupling phase in different positions.
Figure 11B:
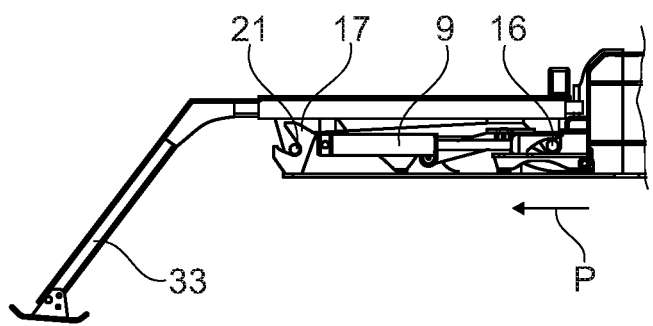
Figure 11C:
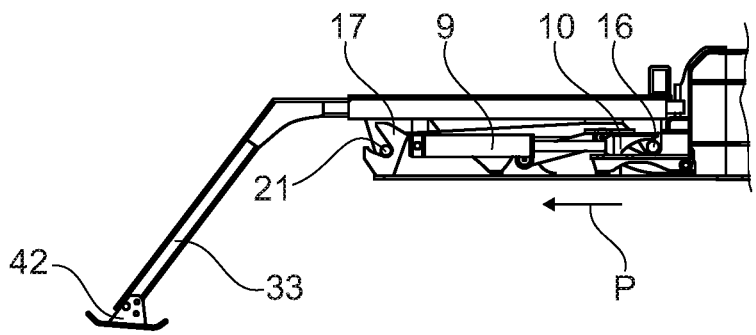
Figure 11D:
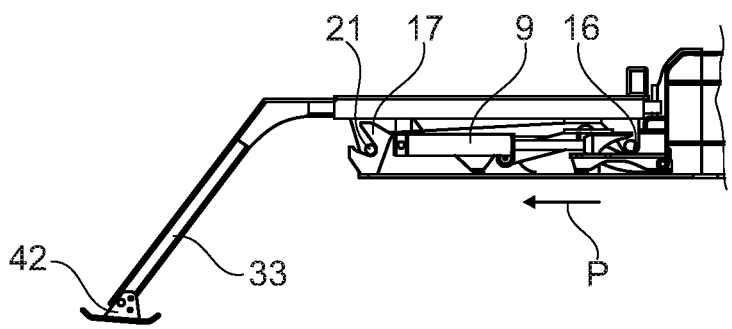
Figure 14A:
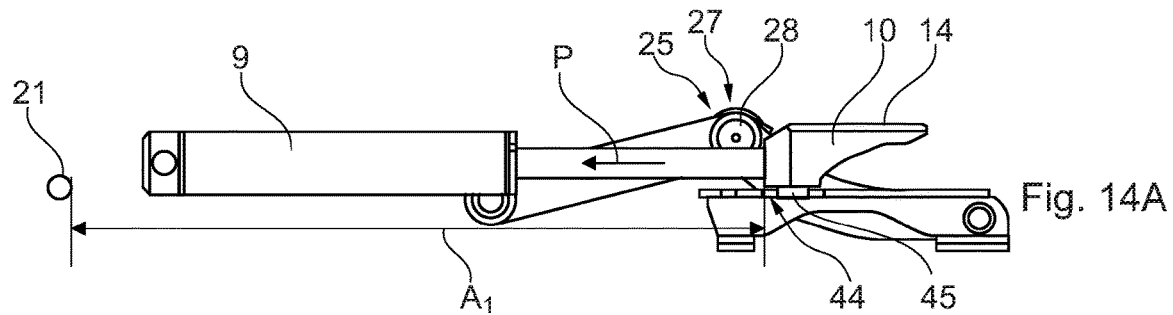
FIG. 14A-14D and FIG. 15A-15D show side views of the drive cylinder with a toggle lever and elongated hole guide in various positions.

More details of the demounting process, in particular the uncoupling process, or its individual process stages are moreover shown schematically in FIG. 11 to FIG. 15 and briefly described below in key words. The following explanations or alternatively descriptions refer to the embodiment example shown, which is to say, base vehicle 1 with articulated steering 5 and skip superstructure 30 as the demountable superstructure 30. These explanations or descriptions are and are intended to, however, be of a general nature and can also be referred to (all) other base vehicles 1 and demountable superstructures 30, which is to say, to front-wheel, rear-wheel, all-wheel or skid steering and/or skip superstructures, tank superstructures, concrete mixer superstructures or the like:

FIG. 11a) or alternatively FIG. 14A or alternatively FIG. 4A or alternatively FIG. 6: Setting down the demountable superstructure 30 (not shown in more detail) or platform/support frame 49 of the demountable superstructure 30:

The process substantially starts/occurs in a (lower) locked/tensioned/fastened base position of the demountable superstructure 30, wherein two of the coupling elements 21, 10, 16, 17, which is to say, according to FIG. 1A, the rear locking pins 21 and the tensioning wedge 10 comprise a distance A1, an optional or alternatively advantageous installation of the rear supports 33 to the demountable superstructure 30 or alternatively to support frame 49 thereof, unlocking, wherein the tensioning wedge 10 moves to the left along the arrow P with the aid of the drive 9 or alternatively hydraulic cylinder 9 along an overrunning clutch 44 or alternatively an elongated hole guide 44, wherein, in particular, FIG. 14A illustrates that an entrainment element 45 or alternatively pin 45 is freely movable in the overrunning clutch 44 or alternatively elongated hole guide 44, such that a carriage 46 or its base element 47 remains unadjusted or alternatively immovable.

Figure 12A:
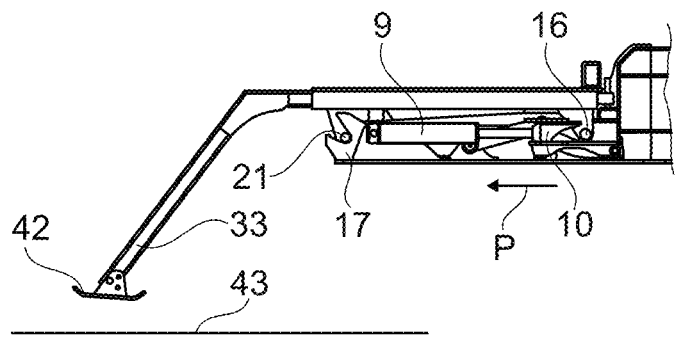
Figure 12B:
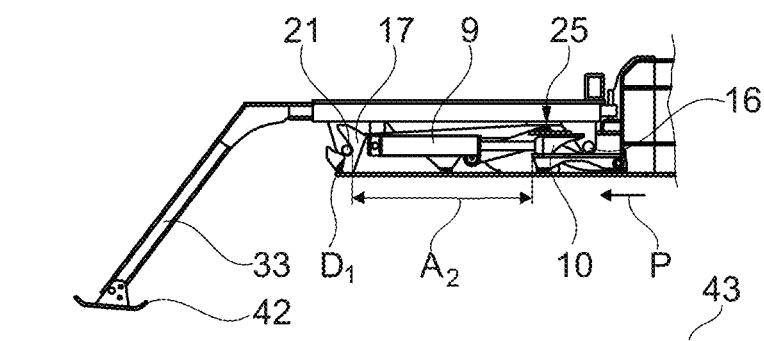
Figure 14B:
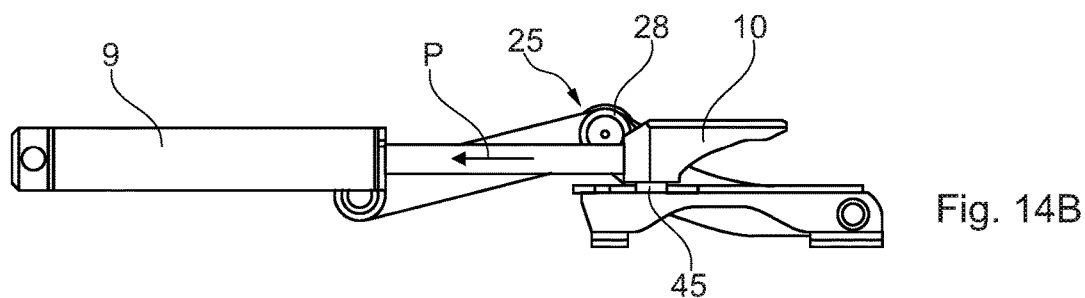
Figure 14C:
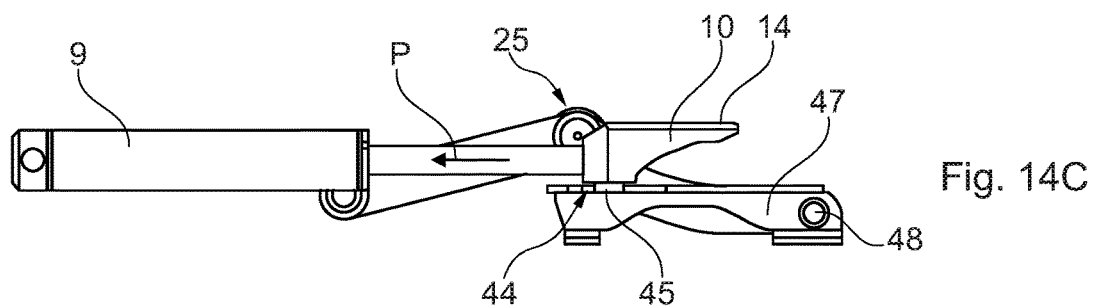
Figure 14D:
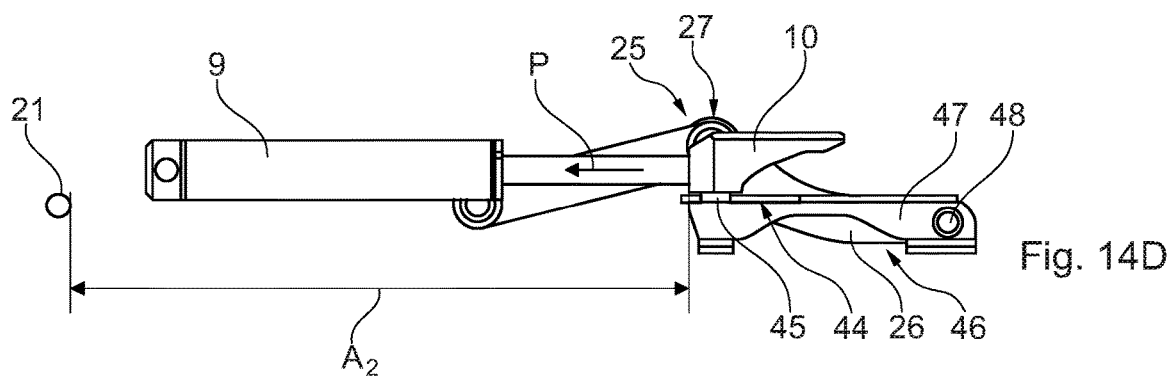

FIG. 11B to FIG. 12B or alternatively FIG. 14B to FIG. 14D:

The tensioning wedge 10 moves further along the overrunning clutch 44 or alternatively elongated hole guide 44 to the left along the arrow P with the aid of the drive 9 or alternatively hydraulic cylinder 9 until, as is illustrated in FIG. 12B or FIG. 14D, the entrainment element 45 or alternatively pin 45 strikes the end of the overrunning clutch 44 or elongated hole guide 44 and from then on is no longer movable therein, wherein the carriage 46 or its base element 47 continues to remain without having been displaced or alternatively immovable, wherein the respective two coupling elements 21, 10, 16 or alternatively the rear locking pin 21 and the tensioning wedge 10 or alternatively (not drawn) comprise a distance A2 to the front pin 16, wherein the distance A2 about the (previous) stroke of the drive 9 or alternatively of the hydraulic cylinder 9 is smaller than the distance A1, the demountable superstructure 30 or alternatively its support frame 49 is now unlocked.

Figure 12C:
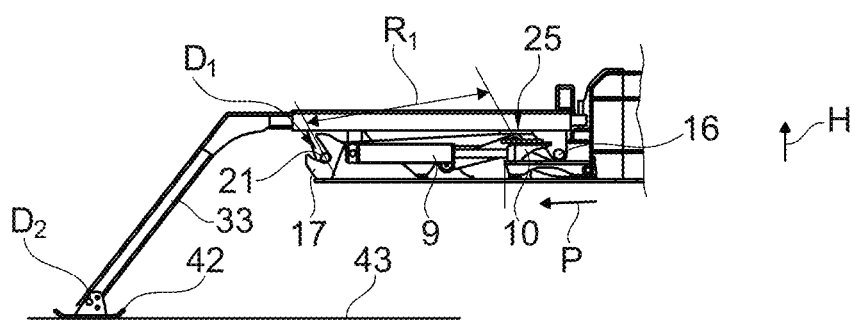
Figure 15A:
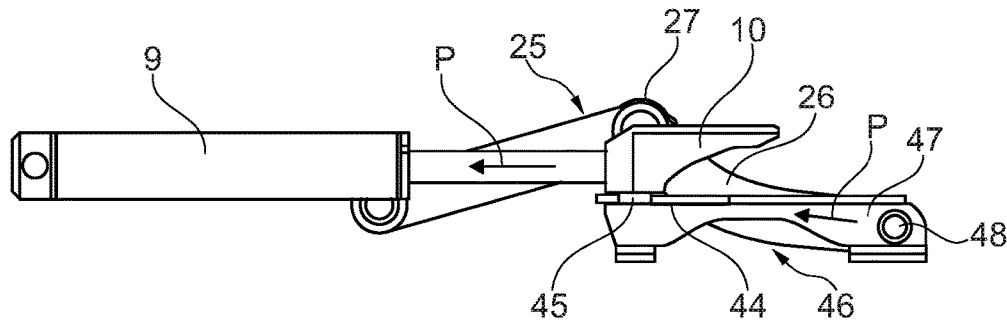
Figure 15B:
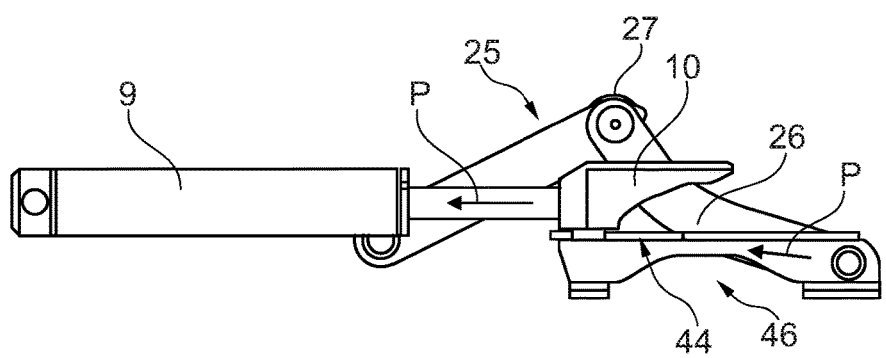

FIG. 12C or, alternatively, FIG. 15A:
The tensioning wedge 10 or alternatively a piston rod of the drive 9 or alternatively cylinder 9 moves further along the arrow P, the entrainment element 45 or alternatively the pin 45, which is attached to the overrunning clutch 44, entrains a base element 47 of a carriage 46, wherein the carriage 46 is connected to the toggle lever 25 by an articulation 48, such that the toggle lever 25 can be rotated relative to the carriage 46, the toggle lever 25 or alternatively its components lift off partially in vertical direction H, in particular an end surface 27, which is configured as end surface 27 and/or engagement element 27, the demountable superstructure 30 or alternatively its support frame 49 rotate about an axis of rotation D1 having a first radius R1, the rear support or alternatively supports 33 are likewise rotated about the axis of rotation D1 and lower downwards in the direction of the ground 43, wherein optionally the support 33 can also have a length adjustment with fastening possibility (not shown), for example, clamping and/or latching, in order, in an advantageous manner, to be (roughly) adaptable to the height or the distance to the ground 43, which is to say, that the wedge 10 had arrived at the end of the elongated hole guide 44 and from this point/condition subsequently moves the carriage 46 with the toggle lever 25 to the left or alternatively along arrow P, wherein the toggle 25 now moves upwards until it strikes against a contact surface of the demountable superstructure 30 or alternatively of its support frame 49, such that it rotates or alternatively is tilted about the axis of rotation D1.

Figure 12D:
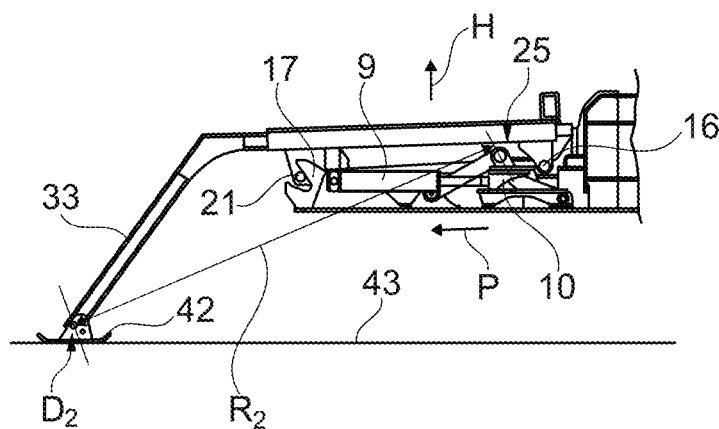

FIG. 12D or, alternatively, FIG. 15A:
The tensioning wedge 10 or alternatively the piston rod of the drive 9 or alternatively cylinder 9 moves further along the arrow P, the entrainment element 45 or alternatively the pin 45 attached to the overrunning clutch 44 further entrains the base element 47 of the carriage 46, the ground supports 33 touch the ground 43 or alternatively are supported on the ground 43, such that the demountable superstructure 30 or alternatively its support frame 49 rotates from now on about a second axis of rotation D2 having a second radius R2, which is to say, by a rocker foot 42 or ground contact surface, the pin 21 is cantilevered out of the receptacle 21 or alternatively lifts off in vertical direction H, wherein optionally or as an advantageous alternative, the rocker foot 42 can also be configured without a free-swinging separate foot (cf. illustration) and wherein in an advantageous manner in its place, for example, a fixedly attached, in particular, curved base plate of the rocker foot 42 is arranged on the support 33, wherein hereby a rolling out movement or alternatively a rotation about a corresponding existing axis of rotation D2 arranged on the ground 43 will also result, which is to say, on the (bent) base plate or its contact surface (not shown), FIG. 13A to FIG. 13B or, alternatively, FIG. 15B to FIG. 15D or, alternatively, FIG. 4C:

The tensioning wedge 10 or alternatively the piston rod of the drive 9 or alternatively cylinder 9 moves further along the arrow P, the entrainment element 45 or alternatively pin 45 attached to the overrunning clutch 44 further carries the base element 47 of the carriage 46, which is to say, the lifting mechanism lifts the superstructure to the end position.

Figure 13A:
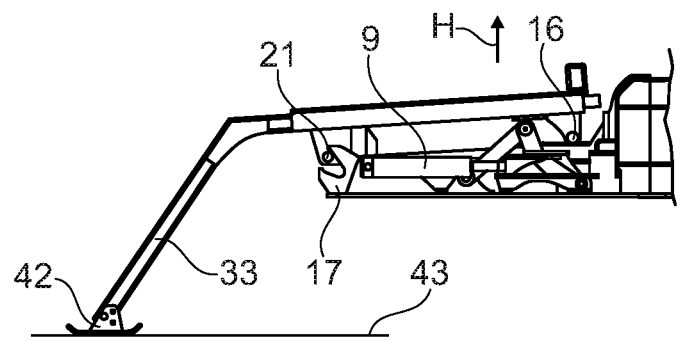
Figure 13B:
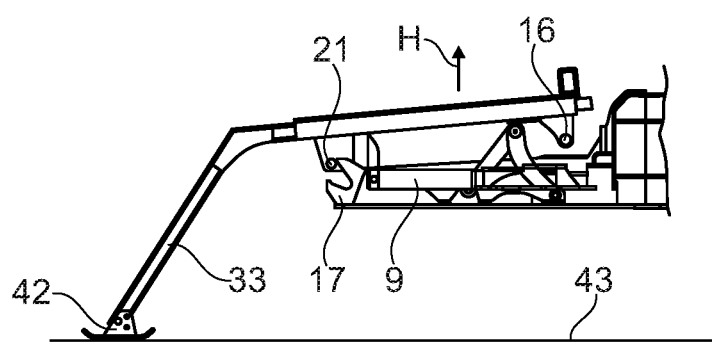
Figure 13C:
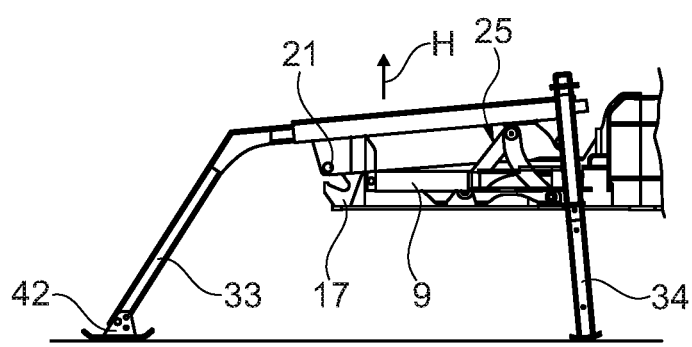
Figure 13D:
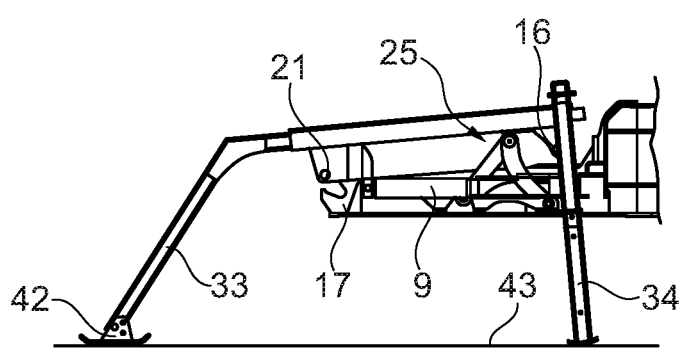
Figure 15C:
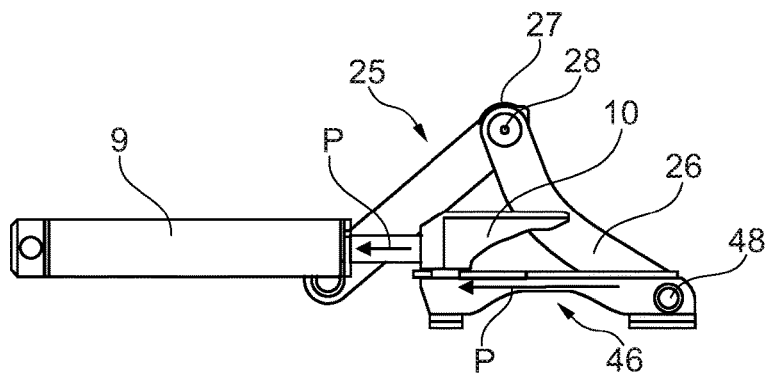
Figure 15D:
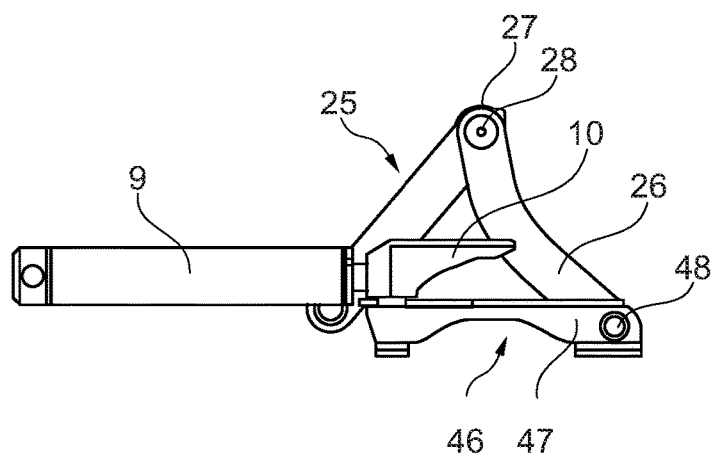

FIG. 13C to FIG. 13D or, alternatively, FIG. 15C to FIG. 15D or, alternatively, FIG. 9:

The front supports 34 are inserted laterally or brought into the supporting position, subsequently, the lateral supports 34 are brought/adjusted to the correct length and fastened, for example, clamped and/or latched, subsequently, the tensioning cylinder 9 can once again travel forward, which is to say, against the arrow P, wherein the superstructure 30 lowers (without closer illustration) until the lateral supports 34 are in full contact with the ground, from this point on, the superstructure 30 can be said to be put down, the base vehicle 1 can move away or drive away.

The picking-up of the demountable superstructure 30 takes place in the corresponding reverse order. Further details such as an electrical contact protection or verification of the presence of the demountable superstructure 30 and/or the locking in, etc. by sensors, switches 12 or alternatively actuators or the like are not explained in more detail here, but can be supplemented or provided in an advantageous manner.

It is moreover of great advantage in the demounting system according to the invention that there are no active or energy-consuming components on the demountable superstructure 30, such that the power for the demounting, which is to say, uncoupling and coupling, or alternatively the drive can be realized not only jointly with a single drive, but also exclusively on the base vehicle. Accordingly, it is, for example, possible that the hydraulic system and/or electric drive system of the base vehicle 1 is used.

The invention claimed is:

1. A construction vehicle comprising:
   a base vehicle having two vehicle units with an articulation arranged therebetween so as to permit the two vehicle units to pivot relative to one another; and
   a skip superstructure with a tipping unit, wherein
   the base vehicle comprises a driver unit, and a steering unit for steering the base vehicle, the steering unit having at least one of, stub axle steering, skid steering, rear-wheel steering, front-wheel steering, and all-wheel steering, wherein
   the base vehicle comprises a coupling unit for coupling and/or uncoupling a demountable superstructure with one or a plurality of coupling elements on the base vehicle, wherein
   a demountable superstructure is provided, which superstructure comprises one or a plurality of coupling elements for coupling the demountable superstructure to the base vehicle, wherein
   the demountable superstructure can be rotated about a first axis of rotation with a first radius during coupling and/or uncoupling, wherein
   a lifting device with a lifting drive is provided for lifting the demountable superstructure, wherein
   the base vehicle comprises a linear drive unit which is configured in the form of an unlocking/locking and/or tensioning unit and at least one first coupling element on a vehicle side of the coupling unit, the position of which can be changed by operation of the drive unit,
   wherein the linear drive unit is also configured as the lifting drive of the lifting device.

2. The construction vehicle according to claim 1, wherein the drive unit is a hydraulic lifting cylinder, wherein a distance between at least two coupling elements on the base vehicle or on the superstructure can be adjusted by operation of the drive unit.

3. The construction vehicle according to claim 1, wherein an adjustment and/or drive direction of the linear drive unit and/or of the first coupling element on the base vehicle is oriented parallel to a forward travel direction of the base vehicle.

4. The construction vehicle according to claim 1, wherein the lifting device comprises at least one engagement element having a contact surface arranged on the demountable superstructure and/or for lifting the demountable superstructure in a lifting position, wherein, in the lifting position, the center of gravity of the demountable superstructure is arranged between the contact surface of the engagement element and the first axis of rotation, and/or wherein the lifting device, in the lifting position for lifting the demountable superstructure, engages on the demountable superstructure with an engagement element arranged in front of the center of gravity of the demountable superstructure with respect to the forward direction of travel with a driver unit and/or arranged in front of the superstructure.

5. The construction vehicle according to claim 4, wherein the lifting device comprises a lever arrangement that a contact surface and/or the engagement element.

6. The construction vehicle according to claim 1, wherein a first lifting drive of the drive unit is configured as an unlocking/locking and/or tensioning phase of the drive unit, and wherein a second lifting drive is configured as a lifting or lowering phase of the drive unit.

7. The construction vehicle according to claim 1, wherein an overrunning clutch is provided with a freewheeling section in the form of an elongated hole guide with a stop element connected to the lever arrangement, the freewheeling section being greater than or equal to a change in distance provided for tensioning and/or locking between two coupling elements provided for tensioning and/or locking the demountable superstructure.

8. The construction vehicle according to claim 1, wherein at least one of the coupling elements on the base vehicle and/or on the superstructure comprises an unlocking/locking and/or tensioning surface running obliquely with respect to the longitudinal axis and/or direction of travel of the base vehicle, and wherein at least one of the coupling elements on the base vehicle and/or on the superstructure is configured as an unlocking/locking and/or tensioning wedge.

9. The construction vehicle according to claim 1, wherein at least one of the coupling elements on the base vehicle comprises a receiving opening oriented towards a rear side of the base vehicle and facing away from the driver unit, the receiving opening being configured to receive at least one of the coupling elements on the superstructure.

10. The construction vehicle according to claim 9, wherein the coupling element on the base vehicle with receiving opening comprises two guide surfaces running obliquely towards one another with respect to a forward travel direction with the driver unit arranged in front of the superstructure.

11. The construction vehicle according to claim 1, wherein a rear coupling element on the base vehicle comprises a guide surface running downwards from a rear to a front thereof, and wherein a front coupling element on the base vehicle comprises an unlocking/locking and/or tensioning surface running downwards from the front to the rear, and/or wherein, in a locked and/or tensioned condition of the demountable superstructure on the base vehicle, a rear coupling element on the superstructure engages under the downwardly extending guide surface of the rear coupling element on the base vehicle and a front coupling element on the superstructure engages under the downwardly extending unlocking/locking and/or tensioning surface of the front coupling element on the base vehicle.

12. The construction vehicle according to claim 1, wherein the demountable superstructure can be rotated about a second axis of rotation with a second radius during the coupling and/or uncoupling phase, wherein the demountable superstructure is rotatable about the first axis of rotation in a first rotational phase and is rotatable about the second axis of rotation in a second rotational phase.

13. The construction vehicle according to claim 12, wherein the first radius of the first axis of rotation is smaller than the second radius of the second axis of rotation.

14. The construction vehicle according to claim 12, wherein the first axis of rotation is configured as a pin element of the demountable superstructure and/or as an unlocking/locking and/or tensioning element of the unlocking/locking and/or tensioning unit, and/or wherein the second axis of rotation is configured as a supporting element of the demountable superstructure.

15. The construction vehicle according to claim 1, wherein a sensor unit in the form of a mechanical button which can be moved by a coupling element on the superstructure is provided for detecting a coupled demountable superstructure and/or wherein the base vehicle comprises a control unit for controlling the travel speed as a function of the type of coupled demountable superstructure and/or for controlling the travel speed as a function of whether or not a demountable superstructure is coupled thereto.

16. The construction vehicle according to claim 1, wherein an operating element, arranged outside the driver unit, is provided for operating the unlocking/locking and/or tensioning unit.

17. The construction vehicle according to claim 15, wherein the control unit comprises at least two operating modes including a driving mode and a demounting mode, wherein,
- in the driving mode, an activation of at least one travel function and/or the control of the travel speed and/or a deactivation of a demounting function, is provided, and/or wherein,
- in the demounting mode, a deactivation of a driving function and/or an activation of a demounting function is provided.

18. A construction vehicle comprising:
a base vehicle having two vehicle units with an articulation arranged therebetween so as to permit the two vehicle units to pivot relative to one another, the base unit including a driver cab;
a skip superstructure having a tipping unit; and
a lifting device that is configured to lift a demountable superstructure relative to the base vehicle; and
a linear drive unit on the base vehicle, the linear drive unit including a linear drive and a first coupling element that is movable with the linear drive unit to selectively 1) couple the first coupling element on the base vehicle to a first coupling element on the demountable superstructure to inhibit relative movement between the base vehicle and the demountable superstructure and 2) uncouple the first coupling element on the base vehicle from the first coupling element on the demountable superstructure to permit relative movement between the base vehicle and the demountable superstructure, wherein
the linear drive unit is also configured as a lifting drive of the lifting device, and wherein
the coupling elements are configured such that the demountable superstructure can be rotated about a first axis of rotation with a first radius during coupling or uncoupling operations.

19. The construction vehicle according to claim 18, wherein the first coupling element on the base vehicle comprises a wedge having an inclined surface that selectively engages the first coupling element on the demountable superstructure.

20. The construction vehicle according to claim 18, further comprising a second coupling element on the base vehicle that includes a receiving opening oriented towards a rear side of the base vehicle and facing away from the driver coupling, the receiving opening being configured to receive a second coupling element on the demountable superstructure.

21. The construction vehicle according to claim 20, wherein the first and second coupling elements are configured such that the demountable superstructure can be rotated about a second axis of rotation with a second radius during coupling or uncoupling operations, and, wherein the demountable superstructure is rotatable about the first axis of rotation in a first rotational phase of a coupling or uncoupling operation and is rotatable about the second axis of rotation in a second rotational phase a coupling or a uncoupling operation.

22. A method for operating a construction vehicle including a base vehicle and a skip superstructure with a tipping unit, wherein the base vehicle uses a driver unit and a steering unit for steering the base vehicle, wherein the base vehicle uses a coupling unit for coupling and/or uncoupling a demountable superstructure with one or more coupling elements on the base vehicle, the method comprising:
coupling the demountable superstructure on the base vehicle using one or more coupling elements, wherein the coupling includes rotating the demountable superstructure about at least a first axis of rotation; and
lifting the demountable superstructure using a lifting device with a lifting drive, wherein
the base vehicle uses a drive unit configured as an unlocking/locking and/or tensioning unit and at least one of the coupling elements on the vehicle side of the coupling unit, the position of which is changed by operation of the drive unit,
wherein the drive unit, is configured as a linear unlocking/locking and/or tensioning unit and is, which also is also configured as the lifting drive of the lifting device.

23. The method according to claim 22, wherein at least a first drive phase of the drive unit, which is configured as a lifting drive, is configured as an unlocking/locking and/or tensioning phase, and wherein a second drive phase of the drive unit, which is configured as a lifting drive, is configured as a lifting or lowering phase of the lifting device.

24. The method according to claim 22, wherein the coupling comprises rotating the demountable superstructure about at least a second axis of rotation, with a second radius during, wherein the demountable superstructure rotates about the first axis of rotation in a first rotation phase and rotates about a second axis of rotation in a second rotation phase, wherein the second axis of rotation as a second radius, wherein the first radius of the first axis of rotation is configured smaller than the second radius of the second axis of rotation and/or wherein the first axis of rotation is configured as an unlocking/locking and/or tensioning element of the unlocking/locking and/or tensioning unit, and/or wherein the second axis of rotation is configured as a supporting element of the demountable superstructure.

* * * * *